United States Patent [19]
Patterson et al.

[11] 4,183,243
[45] Jan. 15, 1980

[54] GAS FLOW MONITOR

[75] Inventors: Maurice M. Patterson; Krishnaswamy Srinivasan, both of Houston, Tex.

[73] Assignee: Shell Oil Company, Houston, Tex.

[21] Appl. No.: 952,013

[22] Filed: Oct. 16, 1978

[51] Int. Cl.$^2$ .............................................. G01F 1/64
[52] U.S. Cl. ................................ 73/155; 73/194 A
[58] Field of Search ................. 73/155, 194 A, 194 B

[56] References Cited

U.S. PATENT DOCUMENTS

| 3,021,708 | 2/1962 | November et al. | 73/194 B |
| 3,376,745 | 4/1968 | Davis | 73/205 D |
| 3,816,773 | 6/1974 | Baldwin et al. | 73/194 A X |
| 3,834,227 | 9/1974 | Patterson et al. | 73/155 |
| 4,046,220 | 9/1977 | Glenn, Jr. | 73/155 X |

*Primary Examiner*—Jerry W. Myracle

[57] ABSTRACT

An improved method and apparatus for measuring gas flow from producing wells using a dynamic pressure transducer to monitor the dynamic pressure in the gas flow. The measured dynamic pressure signal is filtered to remove high frequency components and the resulting signal is converted to a RMS signal. The RMS signal is proportional to the density of the fluid and the square of the fluid velocity. Fluid flow can be calculated by measuring the temperature and static pressure of the fluid and combining these measurements with the measured dynamic pressure.

6 Claims, 1 Drawing Figure

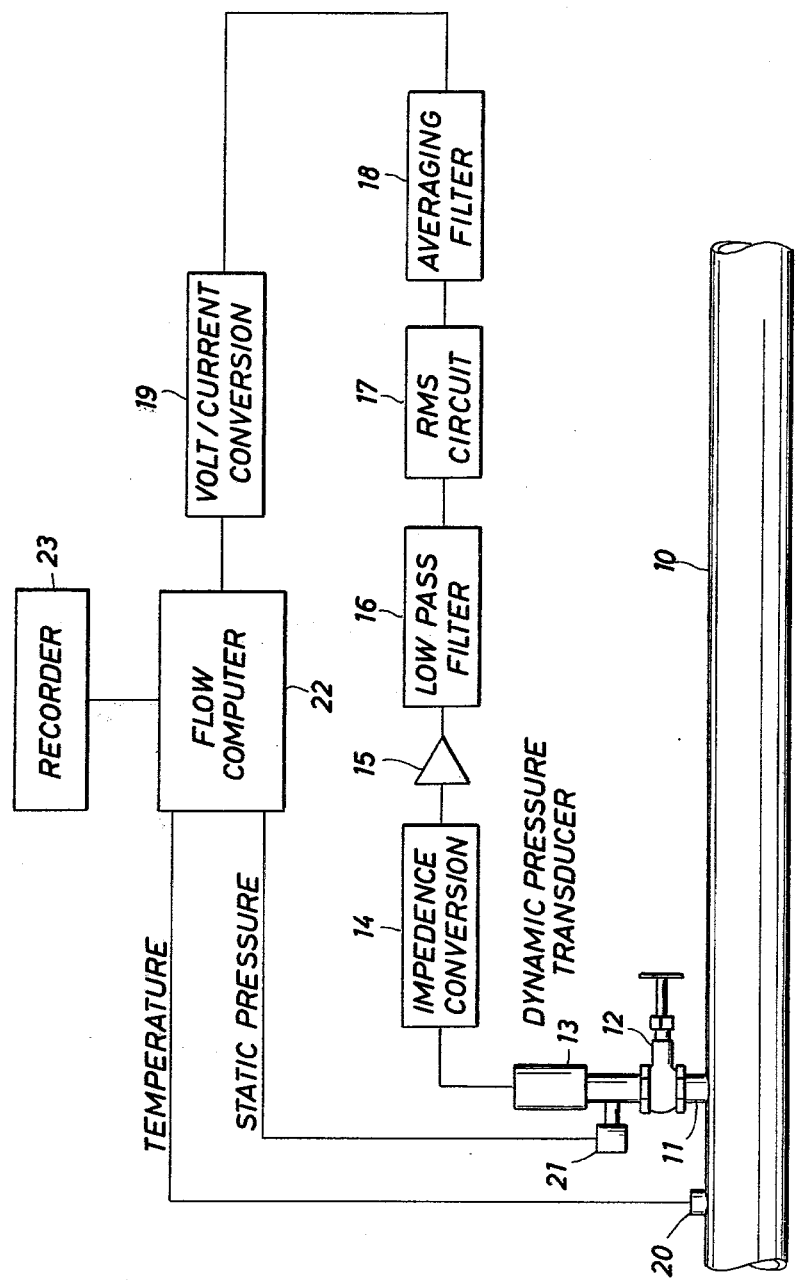

GAS FLOW MONITOR

RELATED PATENTS

The present invention is related to the invention described and claimed in U.S. Pat. No. 3,834,227 issued Sept. 10, 1974.

BACKGROUND OF THE INVENTION

The present invention relates to a method and apparatus for measuring single phase fluid flow, and particularly gas flow from producing wells. The present practice is to use an orifice meter for measuring the gas flow from a producing well to monitor the well performance. While orifice meters are satisfactory, they do present several problems in installation and maintenance. It is obvious that to install the orifice meter, the well must be shut-in to break the production line and install the orifice plate. Likewise, if any maintenance is required, it is necessary to shut-in the well. While shutting in a gas well can be accomplished, production is lost and it requires the observance of suitable safety precautions.

The above referenced patent discloses a dynamic pressure transducer which can be used for measuring liquid flow in a pipe having slug flow. In particular, the patent discloses measuring the dynamic pressure fluctuations in the pipe, taking the root mean square of the dynamic pressure signal and integrating it over a specific time interval to obtain liquid flow in the pipe. This method has been successful in measuring liquid production from gas lift wells but has not previously been adapted to measuring single phase flow and particularly, the flow from a gas well.

BRIEF SUMMARY OF THE INVENTION

The present invention adapts the dynamic pressure transducer described in the prior patent for the measurement of single phase flow and particularly the flow from a gas well. The invention utilizes particular circuitry to treat the signal from the pressure transducer to provide a signal which is related to the gas flow. In addition, the invention provides restrictions on the mounting of the dynamic pressure transducer to insure that its response is related only to the dynamic pressure fluctuations in the single phase flow and not to the resonant characteristics of the installation. Experimental work indicates that the root-mean-square of the measured dynamic pressure is proportional to the product of the density of the fluid and the square of the mean fluid velocity at the measurement location. This relationship is found to be true if the dominant sources of acoustic pressure fluctuations are either fixed restrictions (or bends) in the flowline close to the measurement location or the turbulent flow itself. In wet mist type gas flow, the mean density of the flowing medium is used in the relationship mentioned above.

The invention utilizes a side tap or weldolet attached to the production tubing for mounting the dynamic pressure transducer. The weldolet or side tap includes a valve means which permits the closing off of the side tap while the dynamic pressure transducer is being installed. Thus, there is no need to shut in the well to install the equipment. In addition to the dynamic pressure transducer, the invention also utilizes a means for measuring static pressure of the gas flow and the temperature of the gas flow. Using these measurements, the invention then computes the actual flow rate of the well.

BRIEF DESCRIPTION OF THE DRAWINGS

The present invention will be more easily understood from the following detailed description of a preferred embodiment when taken in conjunction with the drawings showing one embodiment of the invention in block diagram form.

PREFERRED EMBODIMENT

Referring now to the drawing, there is shown a production line 10 from a gas well having a weldolet or side tap 11 attached thereto. As shown, the side tap is located on top of the production line to prevent the accumulation of liquids in the side tap. A valve 12 is provided for closing off the side tap of the line when it is desired to install the dynamic pressure transducer 13 or when the transducer is removed. The signal from the dynamic pressure transducer is supplied to an impedance conversion circuit 14, that converts the high impedance charge output of the transducer to a low impedance voltage output for the amplifier 15. The signal from the amplifier 15 is supplied to a low pass filter 16 which has an upper cutoff frequency in the neighborhood of 30 hertz. The cutoff frequency of the filter should be substantially below the resonant frequency of standing acoustic waves in the side tap 11. The resonant frequency of standing waves in the side tap 11 will, of course, depend primarily upon its length. Thus, it is desirable to maintain the side tap 11 as short as possible to maintain the frequency of the standing waves as high as possible.

The signal from the low pass filter is supplied to a true root-mean-square circuit 17 which converts the alternating or fluctuating signal from the pressure transducer into a relatively steady state DC signal proportional to the root-mean-square of the input signal. Further filtering of the signal may be performed by an averaging filter 18 with a large value of the time constant. The signal is then converted from a voltage signal to a 4 to 20 milliampere current signal by the circuit 19 and supplied to the flow computer 22. The flow computer 22 may comprise any type of circuit which is capable of taking the square root of the product of the dynamic pressure signal times the static pressure divided by the temperature. In addition to taking the square root of the signal, the circuit should also multiply the result by a suitable constant or calibration factor described below. A suitable computer is a Camco model 590 flow computer as manufactured by Camco, Inc., Houston, Texas. This computer can be programmed or hard-wired to perform the above described function. The temperature of the gas is measured by a temperature transducer 20 which may comprise a Rosemount model 444 Alphaline temperature transmitter manufactured by Rosemount, Inc., Minneapolis, Minn. Similarly, the static pressure may be measured in the side tap 11 by a Statham model PA2000 static pressure transmitter manufactured by Gould, Inc., Oxnard, Cal. Both the temperature and pressure transmitters supply milliamp signals which vary over the range of 4 to 20 milliamps. Finally, the signal from the flow computer may be recorded on a suitable recorder 23 or transmitted to another location where it can be used for monitoring the production from the gas well.

The actual dynamic pressure signals sensed by the transducer 13 will depend upon several factors. Some of these factors are the presence or absence of other sources of acoustic pressures in the line such as pumps, bends or restrictions in the line, or check valves which are vibrating. It is preferable that the system be calibrated in place to determine the exact value of the calibration factor for use in the flow computer. The calibration factor is selected for any one flow rate such that the flow rate determined by the gas flow monitor is the same as that obtained from an orifice meter or other similar device in the flowline. The value of the calibration constant would be high if the measurement location is close to a noise source. If it is distant from any noise source, the calibration factor could be quite low. The calibration can also be accomplished using normal custody transfer equipment.

I claim as my invention:

1. A method for determining the gas flow from a well comprising:

producing dynamic pressure fluctuations in the gas flow using fixed restrictions placed in the path of said gas flow;

measuring the dynamic pressure of the turbulent gas flow from said well and producing a related electric signal;

filtering the signal to remove high frequency fluctuations;

taking the RMS value of the filtered signal;

measuring the static pressure and temperature of the gas flow; and, determining the flow rate of said gas from RMS value, static pressure divided by the temperature.

2. The method of claim 1 wherein the flow rate of the gas is proportional to the square root of the product of the RMS signal times the static pressure divided by the temperature.

3. The method of claim 1 wherein all frequencies above the fundamental resonant frequency of transducer installation are attenuated.

4. An apparatus for measuring the flow from a gas well comprising:

a dynamic pressure transducer, said transducer being mounted in a side tap on the production line of said well and downstream of a fixed restriction in the line so that the calibration factor for the instrument depends only on the size of the restriction and the line and the distance of the dynamic pressure transducer from the restriction;

a low pass filter, said transducer being coupled to said filter, said filter having a cutoff frequency below the fundamental resonant frequency of the standing acoustical waves in said side tap;

a RMS circuit means, said filter being coupled to said RMS circuit means, said RMS circuit means producing the RMS signal of said filtered signal;

measuring means disposed to measure the temperature and static pressure of the gas; and, computing circuit means coupled to both said RMS circuit and said measuring means for computing the gas flow.

5. The apparatus of claim 4 wherein said computing means computes the square root of the product of the RMS signal times the static pressure divided by the temperature.

6. The apparatus of claim 4 wherein the length of said side tap is maintained below the length where the resonance frequency of standing waves is below 200 hertz.

* * * * *